United States Patent
Li et al.

(10) Patent No.: US 8,237,720 B2
(45) Date of Patent: Aug. 7, 2012

(54) SHADER-BASED FINITE STATE MACHINE FRAME DETECTION

(75) Inventors: Jinyu Li, Redmond, WA (US); Chen Li, Redmond, WA (US); Xin Tong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 12/370,258

(22) Filed: Feb. 12, 2009

(65) Prior Publication Data

US 2010/0201691 A1    Aug. 12, 2010

(51) Int. Cl.
*G06T 15/00*    (2011.01)
(52) U.S. Cl. ........ 345/473; 345/474; 345/475; 345/505; 348/169
(58) Field of Classification Search .................. 345/473, 345/474, 475, 505; 348/169
See application file for complete search history.

(56) References Cited

U.S. PATENT DOCUMENTS

| | | | |
|---|---|---|---|
| 6,473,086 B1 * | 10/2002 | Morein et al. ................. | 345/505 |
| 6,884,169 B2 | 4/2005 | Tsuchida et al. | |
| 7,474,698 B2 | 1/2009 | Pan et al. | |
| 7,956,893 B2 * | 6/2011 | Lee et al. ...................... | 348/169 |
| 2005/0009605 A1 | 1/2005 | Rosenberg et al. | |
| 2005/0227792 A1 | 10/2005 | McCreary et al. | |
| 2006/0281061 A1 | 12/2006 | Hightower et al. | |
| 2007/0292112 A1 | 12/2007 | Lee et al. | |
| 2008/0088631 A1 | 4/2008 | Bakalash et al. | |
| 2008/0140232 A1 | 6/2008 | Lee et al. | |

FOREIGN PATENT DOCUMENTS

WO    WO2008117490    10/2008

OTHER PUBLICATIONS

Lu, et al., "Robust Gradual Scene Change Detection", retrieved on Jan. 7, 2009 at <<http://ieeexplore.ieee.org/stamp/stamp.jsp?arnumber=817122&isnumber=17691>>, 1999 IEEE, pp. 304-308.
Rasheed, et al., "Detection and Representation of Scenes in Videos", retrieved on Jan. 7, 2009 at <<http://ieeexplore.ieee.org/stamp/stamp.jsp?arnumber=1542086&isnumber=32935>>, IEEE Transactions on Multimedia, vol. 7, No. 6, Dec. 2005, pp. 1097-1105.

* cited by examiner

*Primary Examiner* — Phu Nguyen
(74) *Attorney, Agent, or Firm* — Lee & Hayes, PLLC

(57) ABSTRACT

Embodiments for shader-based finite state machine frame detection for implementing alternative graphical processing on an animation scenario are disclosed. In accordance with one embodiment, the embodiment includes assigning an identifier to each shader used to render animation scenarios. The embodiment also includes defining a finite state machine for a key frame in each of the animation scenarios, whereby each finite state machine representing a plurality of shaders that renders the key frame in each animation scenario. The embodiment further includes deriving a shader ID sequence for each finite state machine based on the identifier assigned to each shader. The embodiment additionally includes comparing an input shader ID sequence of a new frame of a new animation scenario to each derived shader ID sequences. Finally, the embodiment includes executing alternative graphics processing on the new animation scenario when the input shader ID sequence matches one of the derived shader ID sequences.

20 Claims, 5 Drawing Sheets

SHADER-BASED FINITE STATE MACHINE FRAME DETECTION

BACKGROUND

A video game may consist of a plurality of animation scenarios, and each animation scenario may consist of a frame or an animated sequence of frames. The detection of upcoming rendering of a particular animation scenario in real-time during the execution of the video game may enable the individualized manipulation of the detected animation scenario prior to and/or during rendering.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of a shader-based finite state machine animation scenario detection mechanism that detects the upcoming use of a particular sequence of shaders to render a specific frame of an animation scenario. As used herein, a "shader" generally refers to a set of software instructions that may execute on a graphics processing unit (GPU) to render graphics that may be displayed on a computer display. The ability to detect the upcoming use of a particular sequence of shaders to render a specific frame of the animation scenario may provide flexibility in the manipulation of the corresponding animation scenario graphics data prior to and/or during animation scenario rendering. For example, the use of shader-based finite state machine frame detection may enable the insertion of additional data (e.g., graphical advertisements related to the animation scenario) during the rendering of the detected animation scenario. In another example, the use of shader-based finite state machine frame detection may enable the rendering of an animation scenario to be performed via alternative software and/or hardware platforms.

At least one embodiment of shader-based finite state machine frame detection for providing alternative graphical processing on an animation scenario includes assigning an identifier to each shader used to render animation scenarios. The at least one embodiment also includes defining a finite state machine for a key frame in each of the animation scenarios, whereby each finite state machine represents a plurality of shaders that renders the key frame in each animation scenario. The at least one embodiment further includes deriving a shader identifier (ID) sequence for each finite state machine based on the identifier assigned to each shader. The at least one embodiment additionally includes comparing an input shader ID sequence of a new frame of a new animation scenario to each derived shader ID sequences. Finally, the at least one embodiment includes executing alternative graphics processing on the new animation scenario when the input shader ID sequence matches one of the derived shader ID sequences.

Other embodiments will become more apparent from the following detailed description when taken in conjunction with the accompanying drawings.

BRIEF DESCRIPTION OF THE DRAWINGS

The detailed description is includes references to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to a shader-based finite state machine frame detection mechanism that detects the upcoming use of a particular sequence of shaders to render a specific frame of an animation scenario. The animation scenario may be a frame or an animated sequence of frames. As used herein, a "shader" generally refers to set of software instructions that may execute on a graphics processing unit (GPU) to render graphics that may be displayed on a computer display. In various embodiments, a plurality of different shaders may be used to render a specific frame.

Accordingly, the shader-based frame detection mechanism may define a finite state machine for each key frame, whereby the nodes of the finite state machine may represent the shaders executed for each partial rendering of the frame, and the edges between the nodes may represent the execution order of the shaders. The order in which the shaders are executed, as represented by state transition between the nodes of the finite state machine, may then be used to identify the key frame and/or the upcoming animation scenario that includes the key frame.

The ability to detect the upcoming animation scenario may provide flexibility in the manipulation of the graphics data of the animation scenario prior to and/or during animation scenario rendering. For example, the use of shader-based finite state machine frame detection may enable the insertion of additional graphical elements (e.g., graphical advertisements related to the animation scenario) during the rendering of the detected upcoming animation scenario. In another example, the use of shader-based finite state machine frame detection may enable the rendering of an animation scenario to be performed via alternative software and/or hardware platforms. The use of alternative software and/or hardware platforms may enable the animation scenario to be presented using legacy hardware and/or software, thereby facilitating backward compatibility. Various examples of the shader-based finite state machine frame detection mechanism in accordance with the embodiments are described below with reference to FIGS. 1-4.

Exemplary Scheme

Figure 1A:
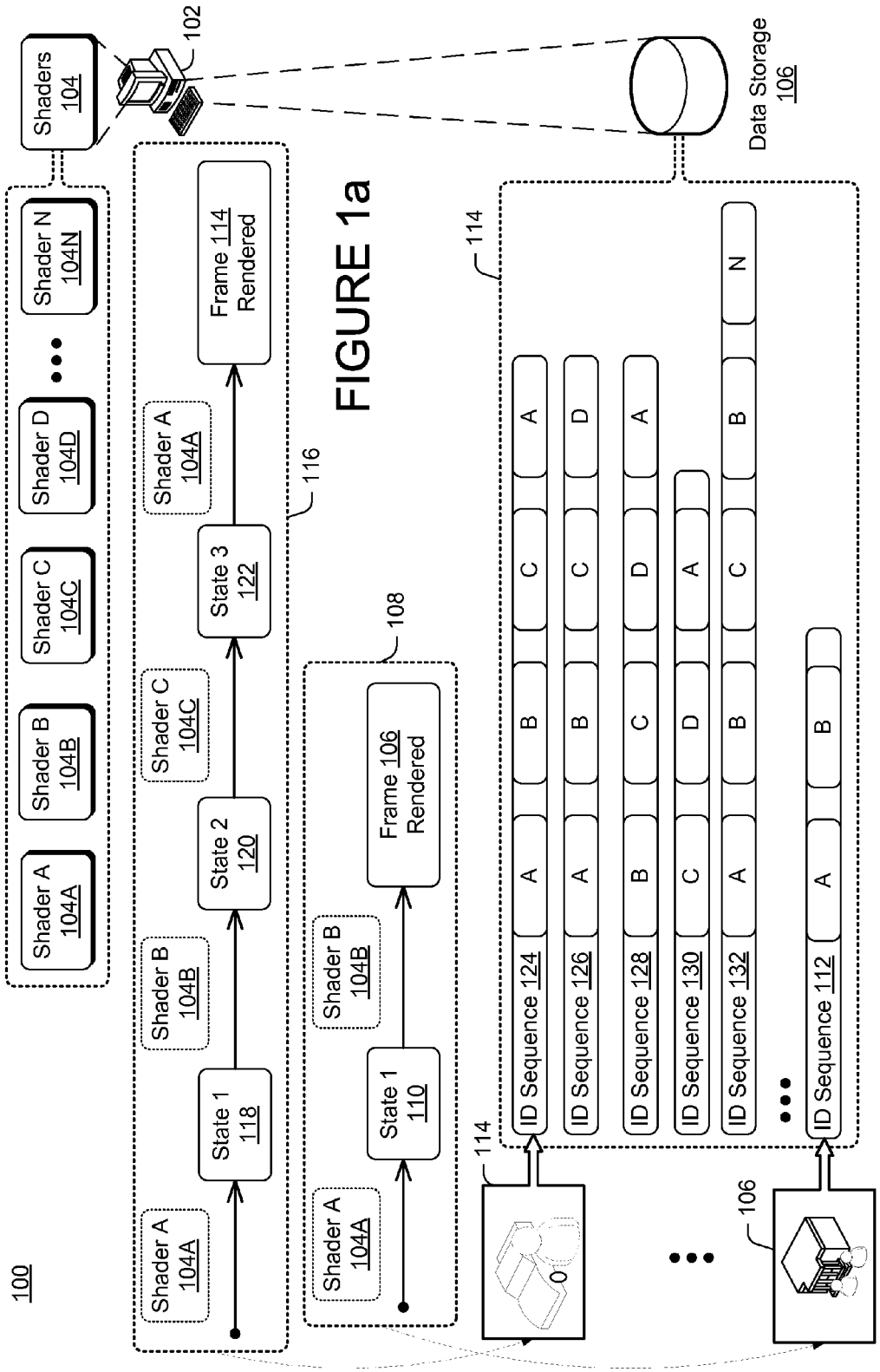
FIGS. 1a and 1b are simplified block diagrams that illustrate an exemplary scheme for performing shader-based frame detection using finite state machines, in accordance with various embodiments.
Figure 1B:
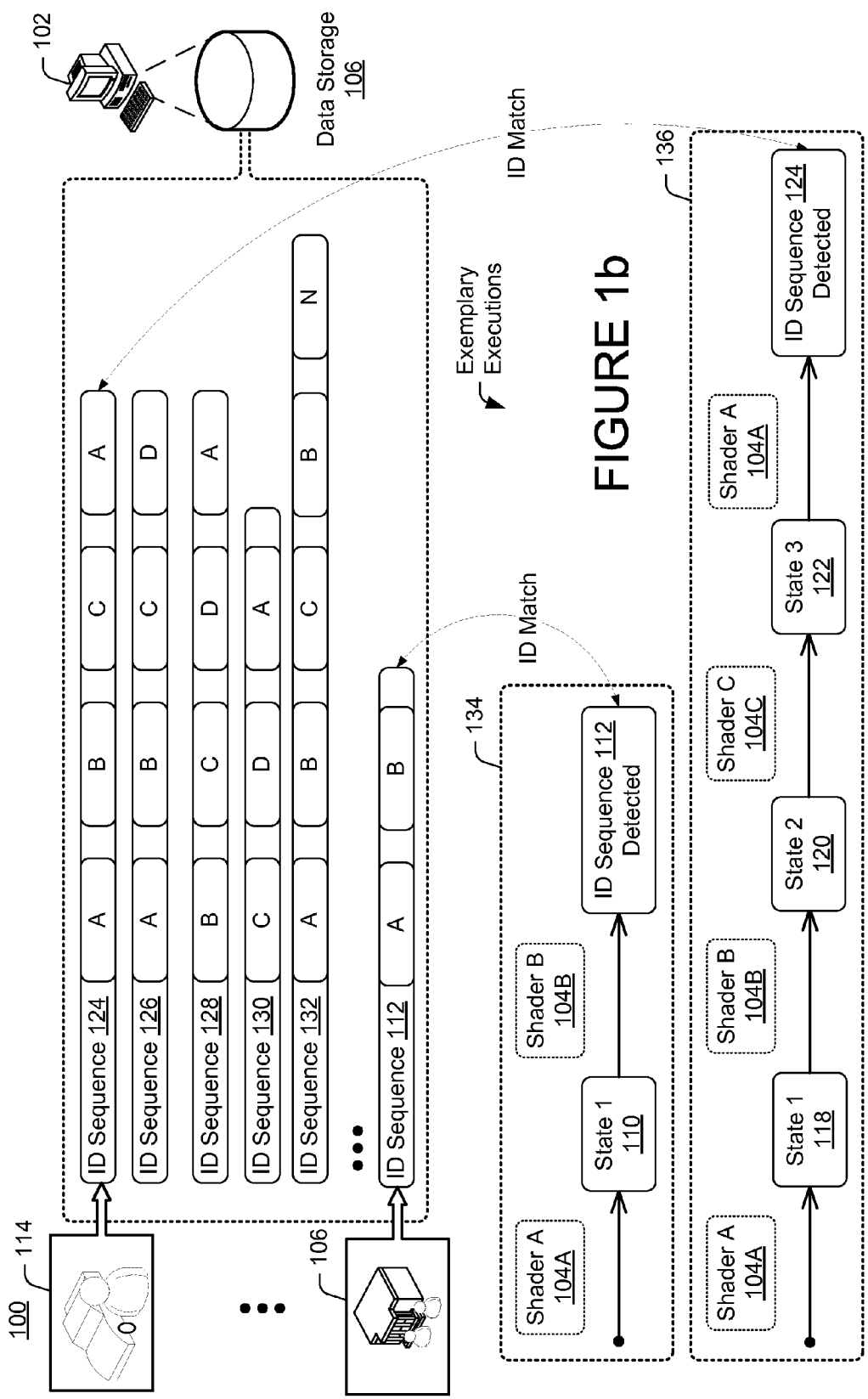

FIGS. 1a and 1b are block diagrams that illustrate an exemplary scheme 100 for performing shader-based frame detection using finite state machines, in accordance with various embodiments. As shown in FIG. 1a, the scheme 100 may include a computing device 102 that includes a plurality of shaders 104 and data storage 106 in its memory. The computing device 102 may make the use the use of a plurality of shaders 104, such as, but not limited to, a shader A 104A, a shader B 104B, a shader C 104C, a Shader D 104D, and a Shader N 104N, to facilitate the rendering of computer graphics. It will be appreciated that the shaders 104A-104N are merely illustrative, and that the shaders 104 may includes multiple permutations of shaders in various embodiments.

Each of the shaders 104 may be one of a vertex shader, pixel shader, a geometry shader, or the like. As further described below, each of the shaders 104 may be in the form of computer-readable instructions, data structures, program modules, and/or other data that execute on a graphics processing unit (GPU). Additionally, the shaders 104 may work cooperatively with other graphics processing software instructions that execute on the GPU, such as rasterizers, to render computer graphics that are suitable for presentation on a computer display. Accordingly, an application (e.g., video game) may activate the shaders 104, as well other graphics processing software instructions, to render various frames of an animation scenario.

In various embodiments, the rendering performed by the various shaders 104 in rendering a frame, such as frame 106, may be defined using a finite state machine. In such a finite state machine, the plurality of shaders 104 may be represented by the nodes of the machine, and the edges between the nodes may be indicative of the execution order. Accordingly, by assigning a unique identifier (ID) to each of the shaders 104, the finite state machine defined for a frame, such as the frame 106, may be identified using a unique shader ID sequence.

For example, in order to render the frame 106 of an animation scenario, the shader A 104A (e.g., pixel shader) may be used to build image pyramids by determining an average value of the pixels that are adjacent to each pixel in the frame 106. Subsequently, the shader B 104B (e.g., pixel shader) may be used to generate final lighting density for the frame 106.

Accordingly, the use of shaders A 104A and shader B 104B in this example may be defined in the form of finite state machine 108. As shown in the example finite state machine 108, Shader A 104A may transform an initial state (e.g., some precursor graphics of the frame 106) into a "State 1" 110. Subsequently, Shader B 104B may transform "State 1" 110 of the finite state machine 108 into the final rendered frame 106. Moreover, the finite state machine 108 may be represented by a unique ID sequence that denotes the execution sequence of the finite state machine 108. For instance, in the case of the finite state machine 108, the execution order of the finite state machine 108 may be represented by a unique ID sequence 112 (i.e., A*B). In various embodiments, the ID sequence 112 may be stored in the data storage 106.

Likewise, in another example, a frame 114 of an animation scenario may be rendered with the execution of the shader A 104A, followed by the shader B 104B, then by the shader C 104C, and once again by the Shader A 104A. Thus, the rendering of the frame 114 in this example may be represented by the example finite state machine 116. As shown in the finite state machine 116, Shader A 104A may transform an initial state (e.g., some precursor graphics of the frame 106) into a "State 1" 118. Subsequently, "State 1" 120 of the finite state machine 114 may be transformed in "State 2" 122 by the Shader B 104B. Next, "State 2" 120 of the finite state machine 114 may be transformed into "State 3" 122 by the shader C 104C. Finally, "State 3" 122 of the finite state machine 116 may be rendered into the frame 114 by the re-execution of the Shader A 104A. Accordingly, the execution order of the finite state machine (i.e., A*B*C*A), may be represented by an ID sequence 124 that is stored in the date storage 106.

It will be appreciated that the data storage 106 may store a plurality of other ID sequences, such as ID sequences 126-132, that correspond to other finite state machines (not shown) of additional frames in different animation scenarios.

FIG. 1b illustrates the detection of a finite state machine that corresponds to a frame of an animation scenario. As shown, a plurality of finite state machine ID sequence, (e.g., ID sequences 112, 126-132) may be stored in the data storage 106 of the computing device 102. As previously described, each of the finite state machine ID sequences may represent the nodes and the execution order of shaders used to render a particular frame (e.g., frame 106) of an animation scenario.

During graphics rendering, the computing device 102 may execute a plurality of shaders 104, as well other graphics processing software instructions on a GPU to render various animation scenarios. The computing device 102 may perform the execution under the direction of an application (e.g., video game, video viewing program, etc.).

In various embodiments, the computing device 102 may identify the plurality of different shaders 104 that are to be executed for the rendering of a particular frame of an animation scenario. This shader identification information may be referred to as an input shader ID sequence. In such embodiments, the computing device 102 may identify an input shader ID sequence prior to executing the shaders identified in the input shader ID sequence. The computing device 102 may then compare the input shader ID sequence to one or more ID sequences that are stored in the data storage 106. Thus, if the shader ID sequence matches a particular stored sequence ID of a finite state machine, the computing device 102 may provide alternative processing to the particular frame and/or the animation scenario that includes the frame.

For example, the computing device 102 may become aware that a finite state machine 134 is called by the application to render a particular frame. The finite state machine 134 may specify that the precursor graphics of the particular frame is to be transformed into a "State 1" 110 by a shader A 104A prior to being further transformed by shader B 104B. Accordingly, the computing device 102 may determine that the ID sequence (A*B) of the finite state machine 134 match the ID sequence 112 stored in the data storage 106. Based on this detection, the computing device 102 may further determine that the particular frame to be rendered by at least some of the shaders 104 is the frame 106. Thus, the computing device 102 may provide alternative processing to the frame 106 and/or the animation scenario that includes the frame 106.

Likewise, in another example, the computing device 102 may become aware that a finite state machine 136 is called by the application to render a particular frame. The finite state machine 136 may specify that the precursor graphics of the particular frame is to be transformed into a "State 1" 118 by a shader A 104A, into a "State 2" 120 by a shader B 104B, and into a "State 3" 122 by a shader C 104C prior to being transformed once more by the shader A 104A. Accordingly, the computing device 102 may determine that the ID sequence (A*B*C*A) of the finite state machine 136 match the ID sequence 124 stored in the data storage 106. Based on this detection, the computing device 102 may further determine that the particular frame to be rendered by at least some of the shaders 104 is the frame 114. Thus, the computing device 102 may provide alternative processing to the frame 114 and/or the animation scenario that includes the frame 114.

In various embodiments, the alternative processing may include adding additional graphical elements into the identified animation scenario (e.g., animation scenario that includes the frame 106). In a non-limiting example, visual advertisements may be added to the identified animation scenario. Various special visual effects may be added to the identified animation scenario in another non-limiting example.

In other embodiments, the alternative processing may include a diversion of the identified animation scenario (e.g., animation scenario that includes the frame 114) for processing by alternative hardware/software. In a non-limiting example, an application may specify that the identified animation scenario is to be rendered by legacy software, such as a shader that is no longer implemented on the computing device 102 or a special hardware GPU that is no longer available to the computing device 102. Accordingly, the identified animation scenario may be diverted to an alternative algorithm (e.g., software patch) that generates a substitute animation scenario using different graphics processing instructions and/or hardware.

In some embodiments, the substitute animation scenario may be identical, or substantially similar, in visual appearance to the identified animation scenario. In other embodiments, the substituted animation may differ (e.g., less visually complex or more visually complex) from the identified animation scenario. In at least some of these embodiments, the substitute animation scenario may seamlessly replace the original identified animation scenario to provide a similar viewing experience for a user.

Exemplary Components

Figure 2:
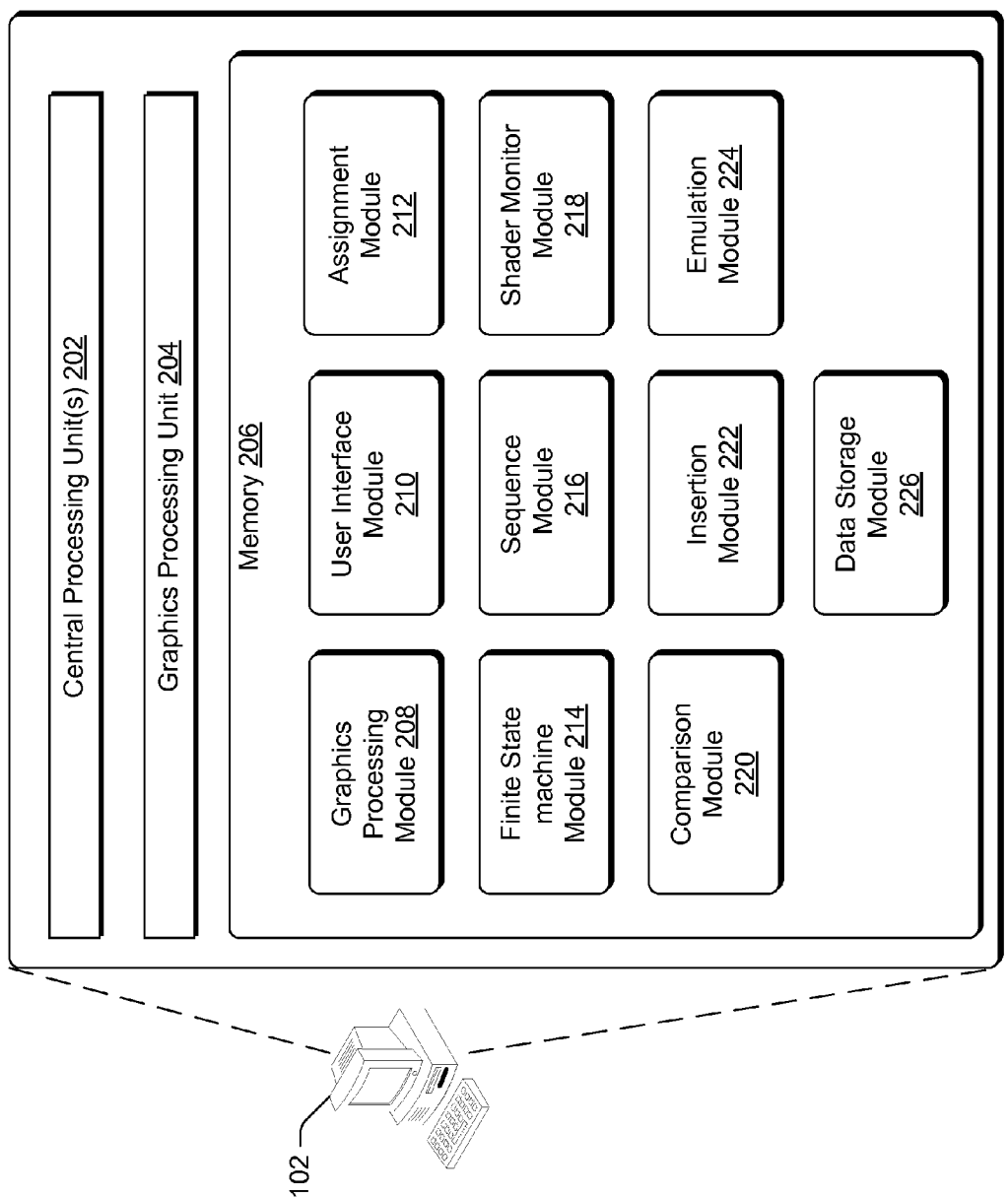
FIG. 2 is a simplified block diagram that illustrates selected components of one exemplary computing device that includes a graphics processing unit (GPU) and performs shader-based frame detection using finite state machines, in accordance with various embodiments.

FIG. 2 is a block diagram that illustrates selected components of the exemplary computing device 102. The computing device 102 may include one or more central processor units 202, a graphics processing unit (GPU) 204, and memory 206. The GPU 204 may be a dedicated graphics rendering device for processing 2-dimensional and/or 3-dimensional graphics for display on a display interface (not shown) of the computing device 102.

The memory 206 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 206 may store program instructions. The program instructions, or modules, may include routines, programs, objects, components, and data structures that perform particular tasks or implement particular abstract data types. The selected program instructions for implementing a shader-based animation scenario detection mechanism may include graphics processing modules 208, a user interface module 210, an assignment module 212, a finite state machine module 214, a sequence module 216, a shader monitor module 218, a comparison module 220, an insertion module 222, an emulation module 224, and a data storage module 226.

The graphics processing module 208 may include the shaders 104 (FIG. 1a), rasterizers, as well as other rendering components necessary for generating graphics for display.

The user interface module 210 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

The assignment module 212 may be used to assign a unique identifier (ID) to each of the shaders 104 that is used to render graphics. In at least one embodiment, the assignment module 212 may present each of the shaders 104 to a user via the user interface module 210 to enable the user to manually assign an identifier to each of the shaders 104. In other embodiments, the assignment module 212 may automatically assign unique IDs to each of the shaders 104 without user intervention. The unique ID assigned to each of the shaders 104 may be stored in the data storage module 226.

The finite state machine module 214 may be used to define one or more finite state machines, whereby each finite state machine corresponds to a frame (e.g., a key frame from an animation scenario). In this way, each key frame may be used to identify a particular animation scenario. As described above, one or more of the plurality of shaders 104 used to render a key frame may be represented by the nodes of a finite state machine, and the edges between the nodes may be indicative of the execution order. Accordingly, by assigning a unique identifier (ID) to each of the shaders 104, the finite state machine defined for a particular key frame, such as the frame 106, may be identified by a unique shader ID sequence. In various embodiments, the one or more key frames from the corresponding animation scenarios may be identified by a user. The user may then interact with the finite state machine module 214 via the user interface module 210 to define a finite state machine for each key frame. In some embodiments, the user may input the one or more key frames into the finite state machine module 214, and the module 214 may define a finite state machine for each key frame.

Since the finite state machine for each frame represents the shaders used to render the frame as well as the execution order of the shaders, and each shader is represented by a unique shader ID, the finite state machine definition module 214 may further using a sequence module 216 to derive a unique shader ID sequence for each frame.

The sequence module 216 may derive a shader ID sequence for each finite state machine based on the nodes and the edges of the finite state machine. As described above, the nodes of a finite state machine represent the shaders used to render a frame, and the edges represent the execution order of the shaders. For example, a finite state machine may include a first shader, such as shader A 104A, that transforms the precursor graphics of a frame to a first state (e.g., "state 1" 110), and a second shader, such as shader B 104B, that transform the first state into a rendered frame. For such a finite state machine, the sequence module 216 may derive the Shader ID sequence "A*B" for such a finite state machine.

The sequence module 216 may store may store the one or more derived shader ID sequences in the data storage module 220. In various embodiments, the derived shader ID sequences may be stored in the data storage module 220 in the form of a state machine transition table. It will be appreciated that in some embodiments, the sequence module 216 may be an integral part of the finite state machine module 214.

The shader monitor module 218 may monitor the shaders 104 that are to be executed for each frame in various animation scenarios, as graphics are rendered by the GPU under the direction of an application (e.g., video game). The shader monitor module 218 may then retrieve the shader ID assigned to each of the shaders 104 that are to be executed. The shader monitor module 218 may then derive a shader ID sequence for each of the frame to be rendered. In various embodiments, the shader monitor module 218 may use the finite state machine module 214 and the sequence module 216 to retrieve and derive the shader ID sequence for each of the frames to be rendered. The shader monitor module 218 may then pass each execution shader ID sequence to the comparison module 220.

The comparison module 220 may receive the one or more input shader ID sequences from the shader monitor module 218, whereby each input shader ID sequence corresponds to a finite state machine. In turn, the comparison module 220 may load the derived shader ID sequences of the finite state machines for the frames of interest. In various embodiments, the derived shader ID sequences may be in the form of a state machine transition table.

The comparison module 220 may then compare each of the execution shader ID sequences to the derived shader ID sequences for the frames of interest. As previously described, the derived shader ID sequences are derived by the finite state machine definition module 214 and stored in the data storage module 226. When the comparison module 220 determines that an input ID sequence from the shader monitor module 218 matches a derived shader ID sequence of a finite state machine stored in the data storage module 226, the comparison module 220 may determine that a particular animation scenario that is to be rendered has been identified and alert the insertion module 222 or the emulation module 224. In various embodiments, the comparison module 220 may perform comparisons that detect the frames of the various animation scenarios by combining the multiple simple state machines for each key frame into one comprehensive finite state machine.

The insertion module 222 may cause the graphics processing component 208 to insert one or more additional graphical elements into one or more frames of the indentified animation scenario. In various embodiments, the additional graphical elements may include, but is not limit to, advertisements, announcements, other visual effects, and/or the like.

The emulation module 224 may include an emulator that diverts the graphical processing of the identified animation scenario to alternative software and/or hardware. In a non-limiting example, an application may specify that the identified animation scenario is to be rendered by legacy software, such as a shader that is no longer implemented on the computing device 102 (FIGS. 1a and 1b) or a special hardware GPU that is no longer available on the computing device 102. Accordingly, the emulation module 224 may divert the identified animation scenario to an alternative algorithm (e.g., software patch) that generates a substitute animation scenario using different graphics processing instructions and/or hardware. In at least one embodiment, the substitute animation scenario may seamlessly replace the original identified animation scenario to provide a similar viewing experience for a user.

It will be appreciated that some embodiments, the finite state machine module 214, the sequence module 216, the shader monitor module 218, the comparison module 220, the insertion module 222 may be incorporated into the emulation module 224.

The data storage module 226 may be configured to store data in a portion of memory 206 (e.g., a database). The data storage module 226 may include the data storage 106 (FIG. 1a). In various embodiments, the data storage module 212 may be configured to store the shader IDs assigned to each of the shaders 104. The data storage module 226 may also store the finite state machines defined for various frames, as well as the unique ID sequences derived for the frames. In at least some embodiments, the derived shader ID sequences may be stored in the data storage module 226 in the form of a state machine transition table.

Exemplary Process

Figure 3:
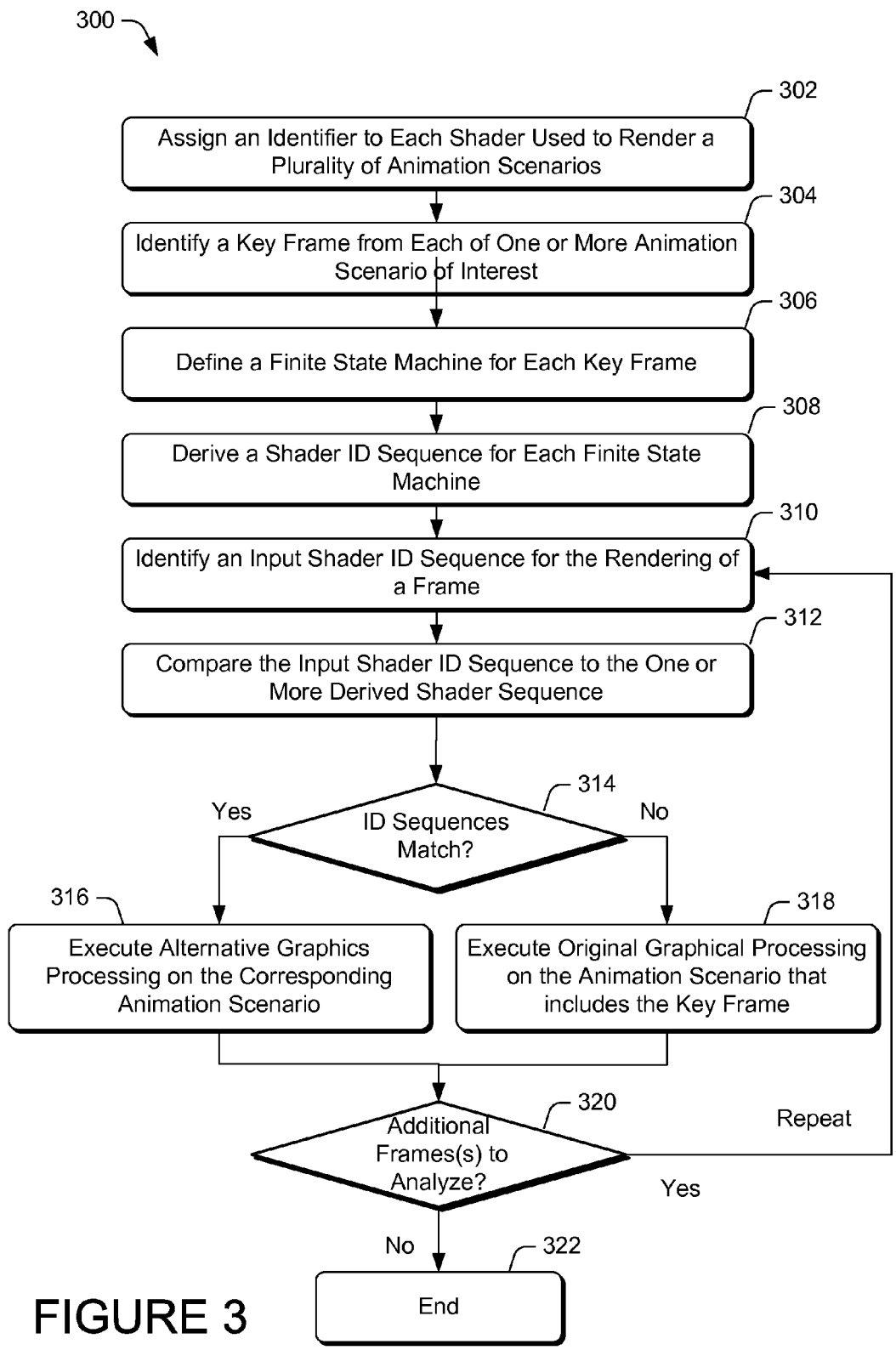
FIG. 3 is a flow diagram illustrating an exemplary process for performing shader-based frame detection using finite state machines, in accordance with various embodiments.

FIG. 3 is a flow diagram illustrating an exemplary process 300 for performing shader-based frame detection using finite state machines, in accordance with various embodiments. The exemplary process 300 in FIG. 3 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to a shader-based animation scenario detection mechanism that is implemented on the exemplary computing device 102 of FIGS. 1a, 1b, and 2, although it may be implemented in other system architectures.

At block 302, the shader-based detection mechanism may assign a unique identifier (ID) may to each of the shaders 104 that are used to render a plurality of animation sequences via a graphics processing unit (GPU), such as GPU 204 (FIG. 2). For example, the shaders 104 may facilitate the rendering of the animation sequences under the direction of application (e.g., video game). In various embodiments, the assignment of the ID to each of the shaders 104 may be accomplished manually by a user, or by an assignment module 212 (FIG. 2).

At block 304, the shader-based detection mechanism may identify a key frame from each of the animation sequences of interest. The animation sequences of interest are sequences that may be designated for alternative graphics processing (e.g., insertion of additional of graphical elements during processing, processing using alternative hardware and/or software, etc.). A key frame may be a frame that, once encountered during graphics processing, enables the transition of its corresponding animation scenario to alternative processing mechanisms. In various embodiments, the key frame may be designated by a user based on analyzing the underlying offline source code, and/or by executing the application that calls the rendering of the animation scenario.

At block 306, the shader-based detection mechanism may define a finite state machine for each key frame. In various embodiments, the one or more of the shaders 104 used to render each key frame may be represented by the nodes of a finite state machine, and the edges between the nodes may be indicative of the execution order.

At block 308, the shader-based detection mechanism may derive a shader ID sequence for each finite machine state. In various embodiments, each shader ID sequence may be derived based on the unique IDs of the one or more shaders 104 used to render the corresponding key frame. The derived shader ID sequences may be stored in a data storage, such as data storage 106 (FIGS. 1a, 1b). In this way, the finite state machine defined for each key frame, such as the frame 106 (FIGS. 1a, 1b), may be identified using a corresponding unique shader ID sequence.

At block 310, the shader-based detection mechanism may identify the input shader ID sequence of a frame that is to be rendered during execution of the application (e.g., video game). In various embodiments, the unique shader ID for each of the shaders 104 that are to be executed for the rendering of the frame may be obtained to derive a corresponding input shader ID sequence. In various embodiments, the input shader ID sequence for a frame that is to be rendered may be derived by defining a finite state machine for the frame in the same way as for a key frame.

At block 312, the shader-based detection mechanism may compare the input shader ID sequence of the frame that is to be rendered with the derived shader ID sequences that are stored in the data storage 106 (FIGS. 1a, 1b). In various embodiments, the comparison may be performed by combining the multiple simple state machines for each key frame into one comprehensive finite state machine during the comparison.

At decision block 314, the shader-based detection mechanism may determine whether the input shader ID sequence matches one of the one or more derived shader ID sequences that are stored in the data storage 106 (FIGS. 1a, 1b). If it is determined that the input shader ID sequence matches one of the one or more derived shader ID sequences ("yes" at decision block 314), the process 300 may proceed to block 316.

At block 316, the shader-based detection mechanism may provide the animation scenario that includes the key frame having the matching input Shader ID sequence with alternative processing. In some embodiments, additional graphical elements (e.g., visual advertisements) may be inserted into the animation scenario. In other embodiments, the animation scenario may be diverted to emulation software and/or hardware for alternative graphical rendering.

However, if it is determined that the input shader ID sequence does not match one of the one or more derived shader ID sequences ("no" at decision block 314), the process 300 may proceed to block 318.

At block 318, the shader-based detection mechanism may execute the animation scenario that includes the key frame using original graphical processing. In various embodiments, the graphical processing may involve one or more of the shaders 104 identified at block 310, as well as other graphical processing components.

At decision block 320, the shader-based detection mechanism may determine whether there are additional frames to be analyzed. For example, the application may provide that other animation scenarios that include additional frames are to be processed using the one or more shaders 104. Thus, if it is determined that there are additional frames to be processed ("yes" at decision block 320), the process 300 may loop block to block 312, where additional frames may be analyzed. However, if it is determined that there are no additional frames to be process ("no" at decision block 320), the process 300 may end at block 322.

Exemplary Computing Environment

Figure 4:
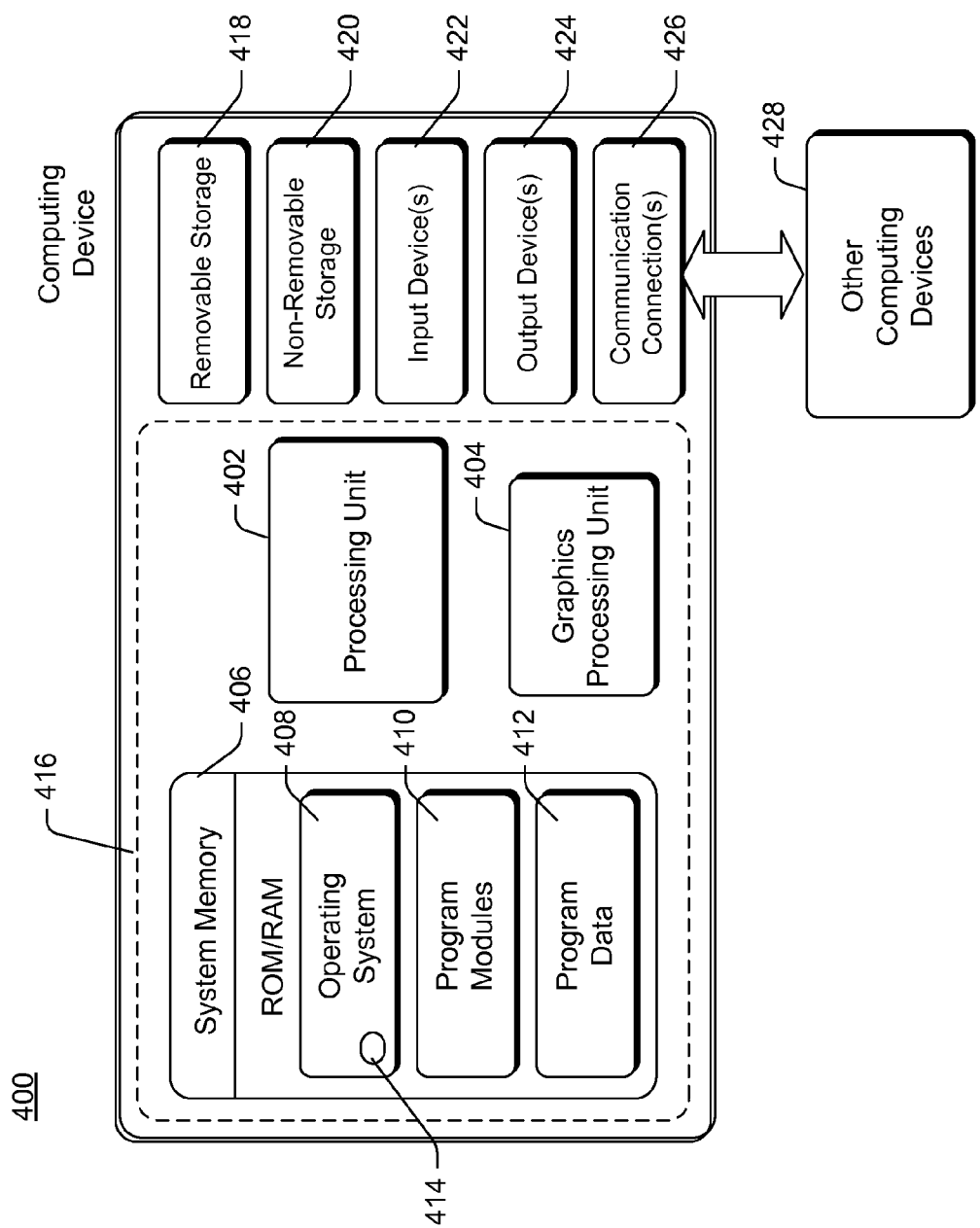
FIG. 4 illustrates a representative computing system that is used to implement techniques and mechanisms for performing shader-based frame detecting using finite state machines, in accordance with various embodiments.

FIG. 4 illustrates a representative computing system 400 that is used to implement techniques and mechanisms for performing shader-based finite state machine frame detection. The exemplary computing device 102, as described in FIGS. 1 and 2, may include one or more components of the computing system 400. However, it will be readily appreciated that the techniques and mechanisms may be implemented in other computing devices, systems, and environments. The computing system 400 shown in FIG. 4 is only one example of a computing system and is not intended to suggest any limitation as to the scope of use or functionality of the computer and network architectures. Neither should the computing system 400 be interpreted as having any dependency or requirement relating to any one or combination of components illustrated in the example computing device.

In a very basic configuration, computing system 400 typically includes at least one central processing unit 402, a graphics process unit (GPU) 404, and system memory 406. Depending on the exact configuration and type of computing device, system memory 406 may be volatile (such as RAM), non-volatile (such as ROM, flash memory, etc.) or some combination of the two. System memory 406 typically includes an operating system 408, one or more program modules 410, and may include program data 412. The operating system 408 includes a component-based framework 414 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 400 is of a very basic configuration demarcated by a dashed line 416. Again, a terminal may have fewer components but will interact with a computing device that may have such a basic configuration.

Computing system 400 may have additional features or functionality. For example, computing system 400 may also include additional data storage devices (removable and/or non-removable) such as, for example, magnetic disks, optical disks, or tape. Such additional storage is illustrated in FIG. 4 by removable storage 418 and non-removable storage 420. Computer storage media may include volatile and nonvolatile, removable and non-removable media implemented in any method or technology for storage of information, such as computer readable instructions, data structures, program modules, or other data. System memory 406, removable storage 418 and non-removable storage 420 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 400. Any such computer storage media may be part of device 400. Computing system 400 may also have input device(s) 422 such as keyboard, mouse, pen, voice input device, touch input device, etc. Output device(s) 424 such as a display, speakers, printer, etc. may also be included. These devices are well known in the art and are not discussed at length here.

Computing system 400 may also contain communication connections 426 that allow the device to communicate with other computing devices 428, such as over a network. These networks may include wired networks as well as wireless networks. Communication connections 426 are some examples of communication media. Communication media may typically be embodied by computer readable instructions, data structures, program modules, etc.

It is appreciated that the illustrated computing system 400 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The ability to detect the upcoming animation scenario may provide flexibility in the manipulation of the graphics data of the animation scenario prior to and/or during animation scenario rendering. For example, the use of shader-based finite state machine frame detection may enable the insertion of additional graphical elements during the rendering of the detected upcoming animation scenario. In another example, the use of shader-based finite state machine frame detection may enable the rendering of an animation scenario to be performed via alternative software and/or hardware platforms.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A system, comprising:
   a graphics processor; and
   a memory that includes a plurality of computer-executable components of a knowledge extraction framework, the plurality of computer-executable components comprising:
   an assignment component to assign an identifier to each shader used to render a plurality of animation scenarios, each shader being a corresponding set of processing instructions executed by the graphics processor to render graphics;
   a finite state machine component to define a finite state machine for a key frame in each of the animation scenarios, each finite state machine representing a plurality of shaders that renders the key frame in each animation scenario;
   a sequence component to derive a shader identifier (ID) sequence for each finite state machine based on the identifier assigned to each shader;
   a comparison component to compare an input shader ID sequence of a new frame to each of a plurality of derived shader ID sequences, the new frame corresponding to a new animation scenario; and
   a rendering component to execute alternative graphics processing on the new animation scenario when the input shader ID sequence matches one of the derived shader ID sequences.

2. The system of claim 1, further comprising a monitoring component to identify the input shader ID sequence for the rendering of the new frame.

3. The system of claim 1, wherein each of the animation scenarios includes one or more frames.

4. The system of claim 1, wherein each of the defined finite state machines includes nodes and edges, wherein each node represents one of a plurality of shaders that renders a corresponding key frame, and the edges represent an execution order of the plurality of shaders that render the corresponding key frame.

5. The system of claim 1, wherein the alternative graphics processing includes inserting graphical elements into the new animation scenario or processing the new animation scenario using at least one of substitute hardware or software.

6. The system of claim 1, wherein the alternative graphics processing includes processing the new animation scenario using at least one of legacy hardware or software.

7. The system of claim 1, wherein the plurality of shaders are to render the animation scenarios for a video game.

8. The system of claim 1, wherein compare an input shader ID sequence of a new frame to each of a plurality of derived shader ID sequences includes combining the finite state machines defined for the key frames into a comprehensive finite state machine.

9. The system of claim 1, further comprising a user interface component to enable a user to identify the key frame in each animation scenario, each key frame enables the identification of the corresponding animation scenario.

10. A method, comprising:
    assigning an identifier to each shader used to render a plurality of animation scenarios, each animation scenario including one or more frames and the each shader being a corresponding set of processing instructions executed by a graphics processing unit to render graphics;
    identifying a key frame in each animation scenario, each key frame enables the identification of the corresponding animation scenario;
    defining a finite state machine for each key frame in each of the animation scenarios, each finite state machine representing a plurality of shaders that renders the key frame in each animation scenario;
    deriving a shader identifier (ID) sequence for each finite state machine based on the identifier assigned to each shader;
    identifying an input shader ID sequence for the rendering of a new frame that corresponds to a new animation scenario;
    comparing the input shader ID sequence of the new frame to each of the derived shader ID sequences; and
    inserting graphical elements into the new animation scenario or processing the new animation scenario using at least one of substitute hardware or software when the input shader ID sequence matches one of the derived shader ID sequences.

11. The method of claim 10, wherein the defining includes implementing a finite state machine for each key frame that includes nodes and edges, wherein each node represents one of a plurality of shaders that renders the corresponding key frame, and the edges represent an execution order of the plurality of shaders that render the corresponding key frame.

12. The method of claim 10, wherein the plurality of shaders are to render the animation scenarios for a video game.

13. The method of claim 10, wherein the processing includes processing the new animation scenario using at least one of legacy hardware or software.

14. The method of claim 10, wherein the inserting includes inserting visual advertisements into the new animation scenario.

15. The method of claim 10, wherein the comparing includes combining the finite state machines defined for the key frames into a comprehensive finite state machine.

16. A computer readable memory storing computer-executable instructions that, when executed, cause one or more processors to perform acts comprising:
    assigning an identifier to each shader used to render a plurality of animation scenarios, each animation scenario including one or more frames and each shader being a corresponding set of processing instructions executed by a graphics processing unit to render graphics;
    defining a finite state machine for a key frame in each of the animation scenarios, each finite state machine representing a plurality of shaders that renders the key frame in each animation scenario;

deriving a shader identifier (ID) sequence for each finite state machine based on the identifier assigned to each shader;

identifying an input shader ID sequence for the rendering of a new frame that corresponds to a new animation scenario; and providing a determination of whether the input shader ID sequence of the new frame matches one of the derived shader ID sequences to a graphical component.

17. The computer readable memory of claim 16, wherein the graphical component is to execute alternative graphics processing on the new animation scenario when the input shader ID sequence matches one of the derived shader ID sequences.

18. The computer readable memory of claim 16, wherein the graphical component is to insert graphical elements into the new animation scenario or processing the new animation scenario using at least one of substitute hardware or software.

19. The computer readable memory of claim 16, wherein the graphical component is to process the new animation scenario using at least one of substitute hardware or software.

20. The computer readable memory of claim 16, wherein the defining includes implementing a finite state machine for each key frame that includes nodes and edges, wherein each node represents one of a plurality of shaders that renders a corresponding key frame, and the edges represent an execution order of the plurality of shaders that render the corresponding key frame.

* * * * *